United States Patent Office 3,143,693
Patented Aug. 4, 1964

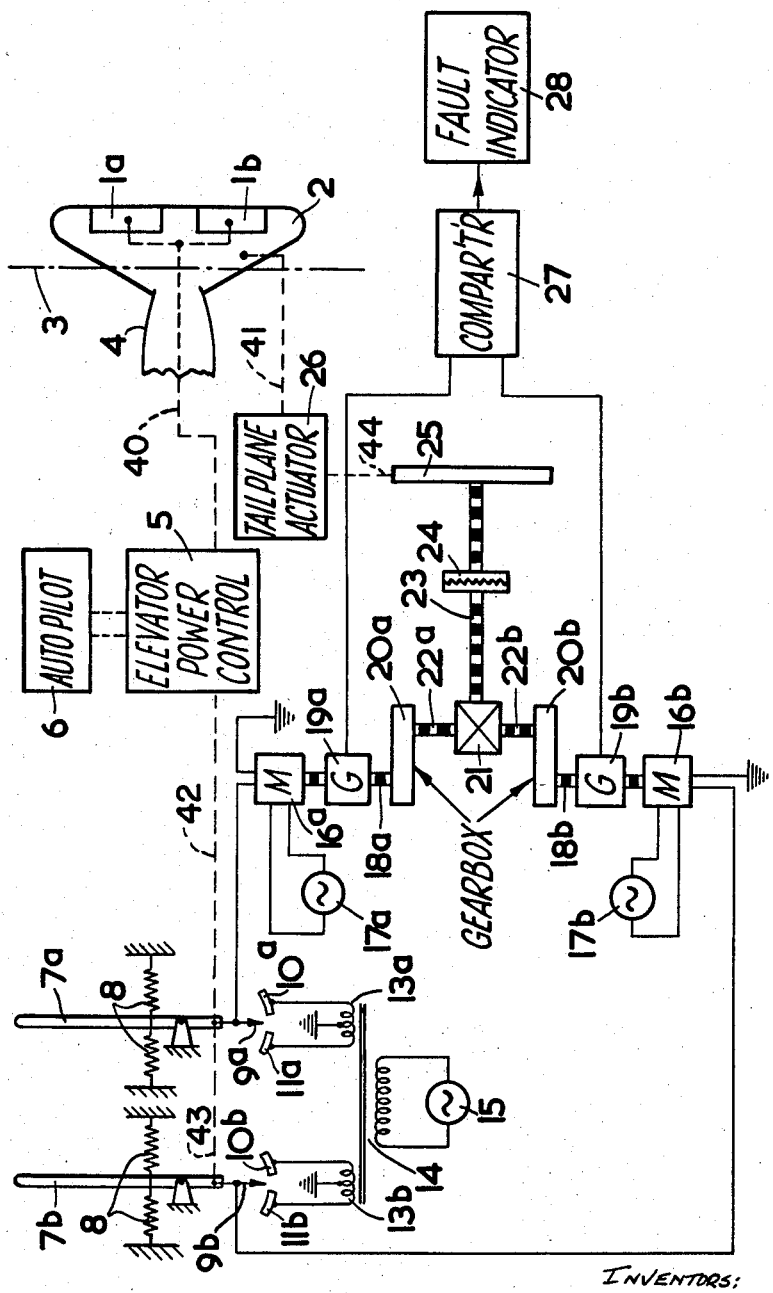

3,143,693
AUTOMATIC TRIMMING SYSTEMS FOR THE CONTROL SURFACES OF A MOVING CRAFT
Kenneth Fearnside, Bredon, near Tewkesbury, and David William Righton, Cheltenham, England, assignors to Smiths America Corporation, Lakeland, Fla.
Filed Feb. 26, 1960, Ser. No. 11,311
21 Claims. (Cl. 318—8)

The present invention relates to automatic trimming systems for the control surfaces of a moving craft, in particular for an aircraft.

Trimming systems are utilised in moving craft to reduce, and in certain circumstances to remove substantially completely, long term loads on the means, which may be manual or automatic, provided for actuating the control surfaces which control the attitude of the craft. Such systems may comprise auxiliary control surfaces together with appropriate means for actuating them to counteract persistent loads on the main control surfaces, or they may comprise means to position a main aerodynamic surface of the craft, (for example, the tailplane in the case of an aircraft) for the same purpose.

Trimming systems may be operated either manually, under the control of a human pilot, or automatically whether or not the corresponding control surface is under automatic control. However if a trimming system is operated automatically while an aircraft is under automatic control, it is essential that the trimming system should have extremely high reliability. If an appreciable out of trim condition exists in the elevator control channel of an aircraft under automatic control, this may well produce a dangerous manoeuvre if the automatic control is disengaged, so it is most desirable that the trimming system itself should be incapable of producing a dangerous out of trim condition if a fault should occur in it.

It is the object of the present invention to provide an automatic trimming system for a control surface or surfaces of a moving craft, which system has a high degree of reliability.

According to the present invention we provide an automatic trimming system for a control surface or surfaces of a moving craft comprising a detector responsive to out of trim conditions about the axis about which said control surface or surfaces cause rotation of the craft, the detector having a first state corresponding to no appreciable out of trim and second and third states respectively corresponding to appreciable out of trim of the craft in opposite senses about said axis, first and second similar independent channels with inputs controlled by the detector, the channels both producing zero output when the detector is in its first state and, when the detector is in either of its second and third states, outputs which are nominally equal in magnitude and of the same sense which sense changes according as to whether the detector is in its second or its third state, and positionable means associated with the control surface or surfaces to correct out of trim conditions about said axis, said positionable means being moved at a rate proportional to the algebraic sum of the outputs of the two channels.

Preferably the detector includes first and second detectors which are identical and are respectively associated in an identical manner with the first and second channels.

Preferably the first and second channels each include an output motor which drives an output member at a rate which represents the output of the channel, the members being coupled to the inputs of a mechanical differential, the output member of which is coupled to drive the positionable means.

Preferably a warning device is provided, responsive to discrepancies between the outputs of the two channels.

Conveniently each detector may include a three-position electric switch, and the channels may then include synchronous electric motors controlled thereby.

An embodiment of the invention, in which the system is provided to effect automatic trimming of an aircraft elevator system, will now be described by way of example with reference to the accompanying drawing which shows a schematic diagram of the elevator control system and the associatde automatic trimming device.

In this instance the aircraft has two elevators $1a$ and $1b$, mounted on the tailplane 2 in the usual manner, and trimming is effected by moving the tail plane 2 bodily about an axis 3 which is horizontal in the aircraft, part of the rear end of the fuselage 4 of which is shown diagrammatically in the drawing. Elevators $1a$ and $1b$ are actuated by an elevator power control system 5 through mechanical linkage 40. Tailplane 2 is actuated by tailplane actuator 26 through mechanical linkage 41.

The elevators $1a$ and $1b$ are positioned directly by elevator power control system 5 which may comprise in known manner two hydraulic actuators, the inputs to which are actuated either by two substantially independent sub-channels of an automatic pilot 6 or through mechanical linkages 42 and 43 by two manually operable control columns, $7a$ and $7b$, the first and second pilots' control columns respectively, provided with "feel" springs 8 in a conventional way, the arrangement being such that if the hydraulic actuators are under the control of the automatic pilot 6 control columns $7a$ and $7b$ take up, at any instant, positions corresponding to the positions of the elevators $1a$ and $1b$.

The control columns $7a$ and $7b$ carry moving electric contacts $9a$ and $9b$ capable of engaging one or other of two fixed contacts $10a$ and $11a$ or $10b$ or $11b$ if the columns $7a$ and $7b$ are displaced from their mid-positions by more than a predetermined amount. Each set of contacts $9a$–$11a$ and $9b$–$11b$ constitutes a detector responsive to out of trim conditions since the contacts $9a$ and $9b$ make contact with the fixed contacts $10a$ and $10b$ or $11a$ and $11b$ if the aircraft is out of trim in pitch in one sense or the other. Contacts $10a$ and $11a$ are connected to either end of a secondary winding $13a$, having a grounded centre tap, of a transformer 13 whilst contacts $10b$ and $11b$ are similarly connected to secondary winding $13b$. The transformer primary winding 14 is energised from an A.C. voltage supply source 15. The moving contact $9a$ is connected to one terminal of one phase winding of a two phase hysteresis motor $16a$, the other terminal of the winding being grounded and the other phase winding being connected across a second A.C. supply source $17a$ in quadrature with the source 15. Thus, the hysteresis motor $16a$ will, in operation, be stationary or rotating at a constant speed in one direction or the other according as to whether the control column $7a$ is substantially central or displaced in one sense or the other. A precisely similar hysteresis motor $16b$ is controlled in precisely the same manner in accordance with displacement of the second control column $7b$, the connections of contacts $9b$, motor $16b$ and A.C. supply source $17b$ being identical with the corresponding connections for the motor $16a$.

The hysteresis motors $16a$ and $16b$ each have, mounted on their output shafts $18a$ and $18b$, similar tachometric generators $19a$ and $19b$, and their output shafts $18a$ and $18b$ also drive, through reduction gear boxes $20a$ and $20b$, the two inputs of a conventional mechanical differential gear 21, the sense of connection of the output shafts $22a$ and $22b$ of the gear boxes $20a$ and $20b$ being such that when the control columns $7a$ and $7b$ move together in one direction or the other, the output drives of the motors $16a$ and $16b$ are combined additively by the differential gear 21 to give rotation of the output shaft 23 in a corresponding direction.

Output shaft 23 is coupled through a friction clutch 24 to the elevator trim handwheel 25, rotation of which causes the tail plane actuator 26 to rotate the tailplane 2 about the axis 3 in the direction required to adjust the trim of the aircraft in pitch. Handwheel 25 is operatively connected to tailplane actuator 26 through mechanical linkage 44. If required, the handwheel 25 can be operated manually and independently of the automatic trimming device, over-riding the automatic control by operation of the friction clutch 24.

The output voltages generated by the two tachometric generators 19a and 19b are applied to a comparator 27 of any known and suitable form which in its turn actuates a warning fault indicator 28 if there is a persistent discrepancy between the generator output voltages. The fault indicator 28 may for example include relays operated under the control of an output voltage from comparator 27 to energise warning lights or audible warning devices.

The operation of the system is as follows:

In normal circumstances if an out of trim condition arises, both control columns will be persistently displaced from their datum positions in the same sense either manually or indirectly by the auto-pilot if the latter is in operation. The two hysteresis motors 16a and 16b will then be energised and the movements of their output shafts 18a and 18b combined to re-position the tail plane 2 to remove the out of trim condition. If a fault arises such that one sub-channel of the automatic trim system becomes "dead," adjustment of the tail plane 2 in the sense to correct out of trim will still occur, but at half the speed at which it would if both sub-channels were operative. At the same time, the warning fault indicator 28 will be operated to warn the pilot of the fault.

If a fault arises such that one sub-channel of the automatic trimming system runs away, the other functioning normally, the control columns 7a and 7b will be displaced either by the pilot or the autopilot 6, as the case may be, in the sense necessary to maintain the aircraft's pitch attitude. However, the resulting movement of the control columns 7a and 7b will be such that the other sub-channel will operate to counteract the runaway by driving the differential gear 21 in the opposite sense, the hysteresis motors 16a and 16b then running in opposite senses, but at equal speeds, so no alteration of the trim will then be produced by the automatic trimming device despite the runaway and a warning will be conveyed to the pilot by the warning fault indicator 28. Thus, even a runaway auto-pilot sub-channel cannot give rise to a dangerous out of trim condition.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

What we claim is:

1. An automatic trimming system for a control surface means of a moving craft comprising a detector responsive to out of trim conditions about the axis about which said control surface means cause rotation of the craft, the detector having a first state corresponding to no appreciable out of trim and second and third states respectively corresponding to appreciable out of trim of the craft in opposite senses about said axis, first and second similar independent channels with inputs controlled by the detector, the channels both producing zero output when the detector is in its first state and, when the detector is in either of its second and third states, outputs which are substantially equal in magnitude and of the same sense which sense changes according as to whether the detector is in its second or its third state, means for combining the outputs of the two channels algebraically to produce a combined output signal and positionable means associated with the control surface means to correct out of trim conditions about said axis, and means for applying said combined output signal to said positionable means to cause it to be moved at a rate proportional to the magnitude of the combined output signal and in a sense to correct any out of trim condition.

2. A system according to claim 1 in which the detector includes first and second switch elements which are identical and are respectively associated in an identical manner with the first and second channels and means for actuating said switch elements identically in response to out of trim conditions of the craft.

3. A system according to claim 1 in which the detector includes at least one electric switch having first, second and third switching positions corresponding respectively to the first, second and third states of the detector and means for actuating said switch in response to out of trim conditions of the craft.

4. A system according to claim 3 in which each channel includes a reversible electric motor, a source of electrical energy, an energisation circuit coupling the motor and the source and contacts of said switch connected in said circuit and controlling energization of the motor by the source whereby the motor rotates in one direction if the switch is in its second position, in the other direction if the switch is in its third position and is still if the switch is in its first position.

5. A system according to claim 4 in which in each channel the motor is a synchronous A.C. motor having a first phase winding and a second phase winding.

6. A system according to claim 5 in which in each channel the switch has first and second fixed contacts and a moving contact which makes contact with the first and second fixed contacts when the switch is in its second and third position respectively, the source of electrical energy comprises a first source of alternating voltage having output terminals and a second source of alternating voltage in phase quadrature thereto and also having output terminals, the first source including an earth connection such that the voltage across its output terminals is balanced with respect to earth, the first and second fixed contacts are connected across the output terminals of the first source alternating voltage, the first phase winding of the motor is connected between the fixed contact of the switch and earth and the other phase winding is connected across the terminals of the second alternating voltage source.

7. A system according to claim 4 which further includes a differential gear having first and second input members and an output member and in which in each channel the motor is coupled to drive a respective one of the input members of the differential gear, the senses of the drives being such that the output member of the gear is driven according to the sum of the input drives when both motors are operating normally in response to a given out-of-trim condition and the output member being coupled to drive said positionable means.

8. A system according to claim 1 in which each channel includes means for generating a voltage proportional to the output of the channel and the system further includes a warning device means responsive to any substantial difference between said voltages to operate said warning device.

9. A system according to claim 1 for use in an aircraft in which there is at least one control column the position of which in flight is always dependent on that of said control surface means, and said out of trim detector is coupled to said control column to be actuated by movement thereof.

10. An automatic trimming system for a moving craft having control surface means positionable to control the craft about a given craft axis and trimming means associated with the control surface means and positionable to correct any out-of-trim condition about said axis, the system comprising an out of trim detector having a first state corresponding to no appreciable out of trim and second and third states respectively corresponding to an appreciable out of trim condition of the craft in opposite senses about said axis, first and second similar independent channels each having an input coupled to the trim detector to be conditioned thereby and an output, both said channels being conditioned identically by the detector to produce zero signal at said output in response to the first state of the detector and an output signal of predetermnied magnitude at said output in response to the second and third states of the detector, the sense of the output signal being determined in both channels to be in one sense if the detector is in its second state and in the opposite sense if the detector is in its third state, combining means coupled to the outputs of both channels for combining the output signals algebraically (i.e. taking account of their sense) to produce a combined output signal, means for positioning the trimming means, and means coupled to said combining means and said positioning means to actuate the latter to position the trimming means at a rate determined by the magnitude of the combined output signal and in a sense to correct the out of trim condition giving rise to the combined output signal.

11. An automatic trimming system according to claim 10 in which the out of trim detector includes first and second switch elements which are identical and are respectively associated in an identical manner with the first and second channels, one switch element in each channel, and means for actuating said switch elements identically in response to out of trim conditions of the craft, each switch element having first, second and third positions corresponding to the first, second and third states of said trim detector.

12. An automatic trimming system according to claim 10 in which each channel further includes a reversible electric motor, a source of electrical energy, an energization circuit coupling the motor and the source, and contacts of the switch element associated with the channel concerned, the contacts being connected in said circuit and controlling energization of the motor whereby it rotates in one direction when the switch element is in its second position and in the other direction when the switch element is in its third position and is still when the switch element is in its first position.

13. An automatic trimming system according to claim 12 the motor in each channel having an output shaft, said combining means comprising a differential gear having first and second input members and an output member, the output shafts being coupled to drive respective input members of the gear and the output member of the gear being coupled to said positioning means.

14. An automatic trimming system according to claim 10 in which said positioning means comprises a manually operable member for transmitting movement to position said trimming means and a coupling engageable to position said manually operable member automatically in dependence upon the combined output signal.

15. An automatic trimming system according to claim 13 in which said positioning means comprises a manually operable member for transmitting movement to position said trimming means and a coupling comprising a clutch having an input member coupled to the output member of the differential gear and an output member coupled to said manually operable member, to transmit a drive from the output member to the manually operable member.

16. An automatic trimming system according to claim 13 in which there is further provided a pair of tachometer generators coupled one to each of said output shafts, for generating voltages dependent upon the speeds of rotation of the output shafts, a voltage comparator to which said voltages are applied and warning means controlled by the comparator to provide a warning when there is more than a predetermined difference between the magnitudes of the voltages.

17. In an aircraft having aircraft axes, the combination of control surface means movable in opposite senses from a datum position to permit control of the aircraft about one of said axes, a manual control member movable in opposite directions from a datum position and means coupling the manual control member and the control surface means to transmit movements of the manual control member to the control surface means to position it relative to its datum in dependence upon any movement of the manual control member from its datum, trimming means associated with the control surface means and positionable to correct any continuing out of trim condition of the aircraft about said one axis, positioning means actuatable to position said trimming means, an out of trim detector responsive to displacement of said manual control member from its datum position and having first, second and third states respectively corresponding to the manual control member being in its datum position, being displaced in one direction from its datum position and being displaced in the other direction from its datum position, first and second similar independent channels each having an input coupled to the detector to be conditioned thereby and an output, both said channels being conditioned identically by the detector to produce zero signal at said output in response to the first state of the detector and an output signal of predetermined magnitude at said output in response to the second and third states of the detector, the sense of the output signal being determined in both channels to be in one sense if the detector is in its second state and in the opposite sense if the detector is in its third state, means coupled to the outputs of both channels for combining the output signals algebraically (i.e. taking account of their sense) to produce a combined output signal, and means coupled to said combining means and said positioning means to actuate the latter to position the trimming means at a rate determined by the magnitude of the combined output signal and in a sense to correct the out of trim condition giving rise to the combined output signal.

18. In an aircraft, the combination as claimed in claim 17 together with an automatic pilot equipment constructed to be coupled to said control surface means automatically to position it to control the aircraft about said axis and means coupling the automatic pilot to said means coupling the manual control member and the control surface means, the coupling being such that, when the automatic pilot is operable, the manual control member is automatically displaced from its datum position in accordance with any movement of the control surface means caused by the automatic pilot.

19. In an aircraft, the combination as claimed in claim 17 in which the out of trim detector comprises first and second switches each having first, second and third switching positions corresponding to the first, second and third states of the detector and a mechanical linkage between the manual control member and said switches to move them from their first positions to their second positions in response to movement of the manual control member in one sense from its datum and from their first positions to their third positions in response to movement of the manual control member in the other sense from its datum.

20. In an aircraft, the combination as claimed in claim 18 in which the out of trim detector comprises first and second switches each having first, second and third switching positions corresponding to the first, second and third states of the detector and a mechanical linkage between the manual control member and said switches to move them from their first positions to their second positions in response to movement of the manual control member in one sense from its datum and from their first positions to their third positions in response to movement of the manual control member in the other sense from its datum.

21. In an aircraft, the combination as claimed in claim 17 in which said positioning means comprises a manual trim control member manually operable to position said trimming means and said means coupling the combining means and the positioning means comprises a transducer for converting said combined signal into a mechanical movement and a mechanical coupling engageable to transmit said movement to the manual trim control member.

References Cited in the file of this patent
UNITED STATES PATENTS

| | | |
|---|---|---|
| 2,626,114 | Alderson | Jan. 20, 1953 |
| 2,883,594 | Alberts | Apr. 21, 1959 |